United States Patent Office 2,781,203
Patented Feb. 12, 1957

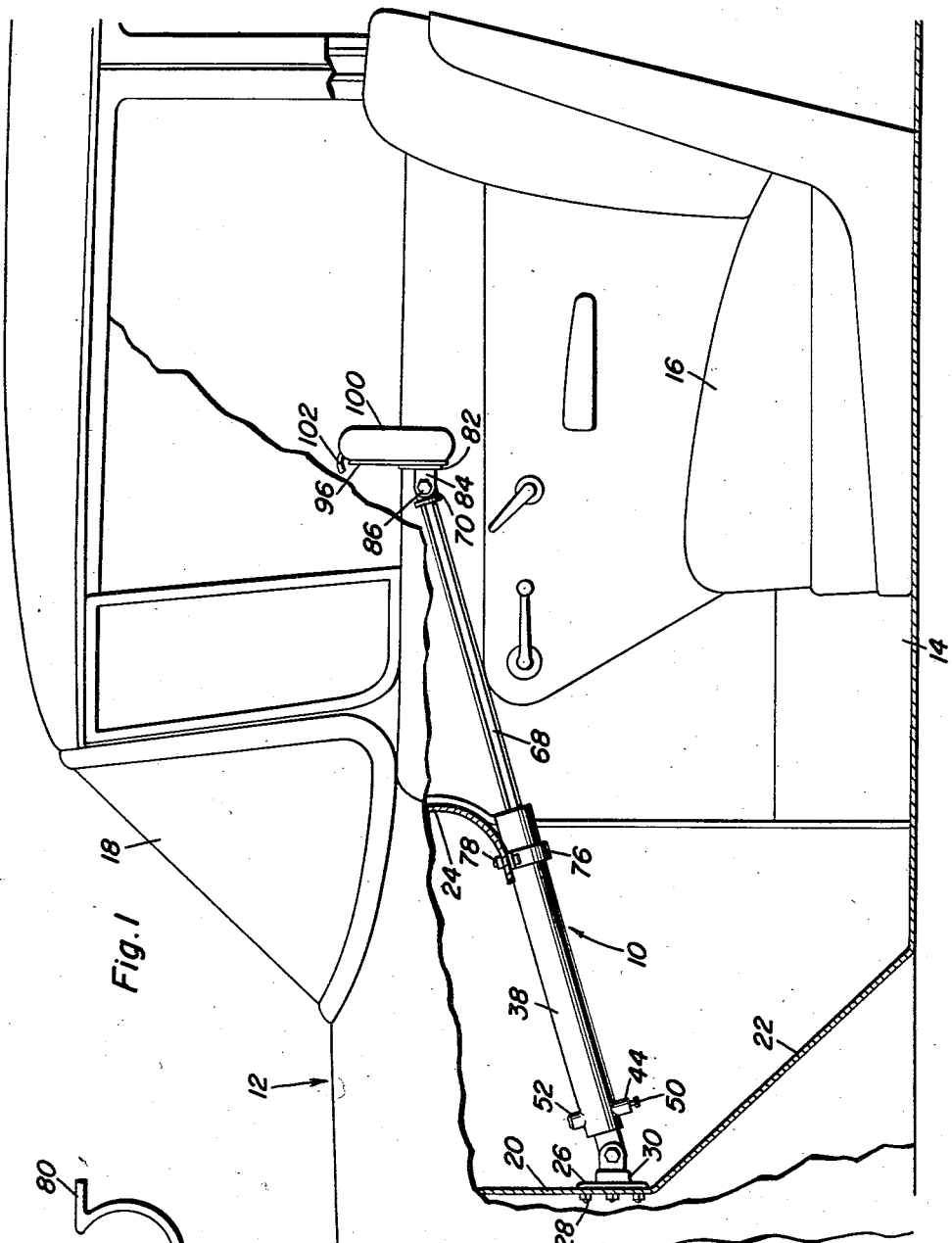

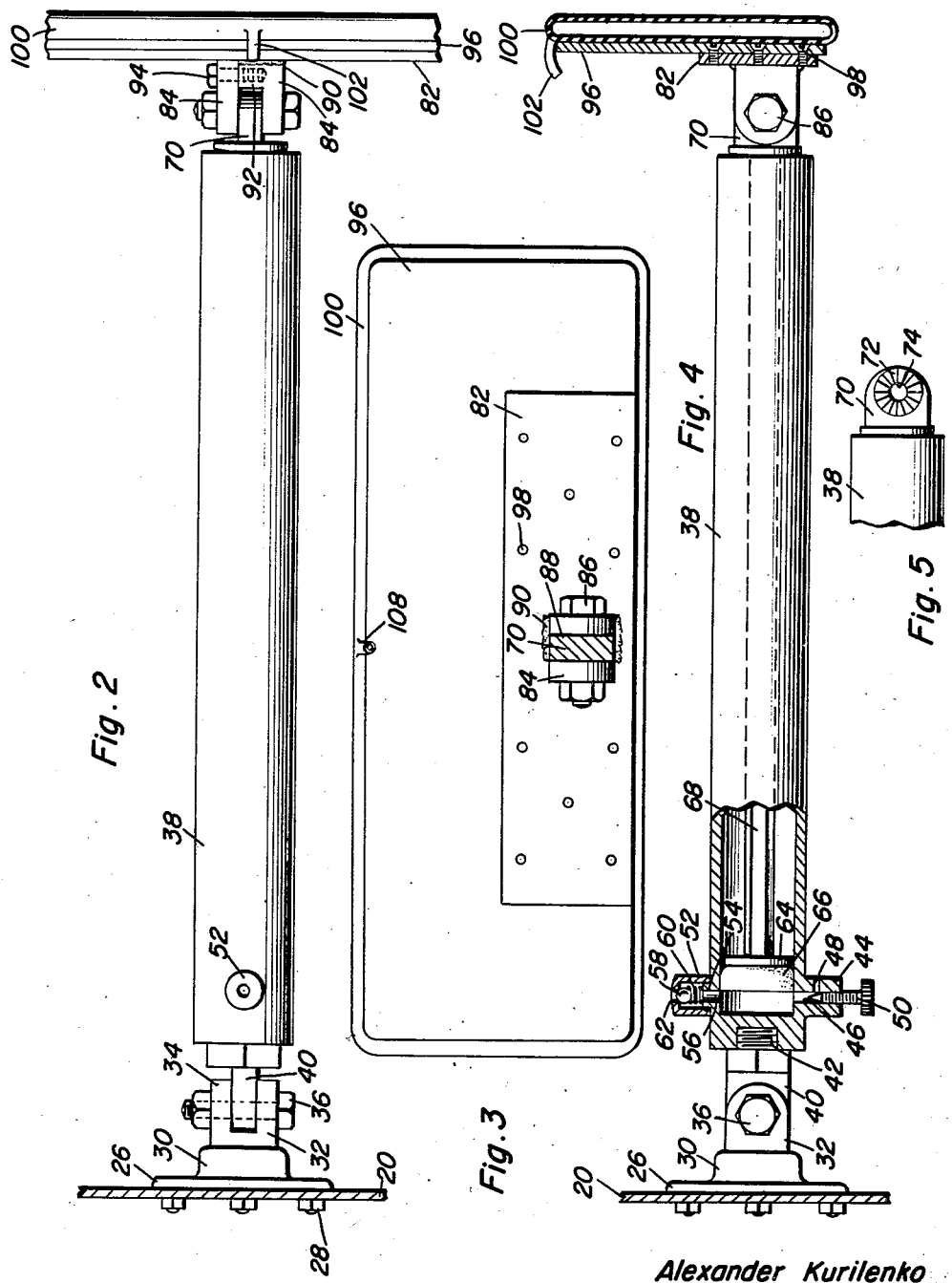

2,781,203

PASSENGER SAFETY DEVICE FOR VEHICLES

Alexander Kurilenko, South Williamsport, Pa.

Application March 30, 1955, Serial No. 497,868

1 Claim. (Cl. 280—150)

This invention generally relates to a safety device and more specifically provides a safety device for use in automotive vehicles which is adapted to be mounted in the passenger compartment of a vehicle for protecting the passenger riding alongside the driver from injurious contact with the windshield, dashboard or the like.

Many persons suffer serious injury or death when hurled against an unyielding structural portion of an automotive vehicle when the vehicle is involved in a collision or is suddenly decelerated for any other reason. This is especially prevalent in passengers seated alongside the driver of the vehicle inasmuch as such a passenger does not have any object to cushion his movement. Accordingly, it is a primary object of the present invention to provide a safety device in the form of an extensible member that is cushioned in its inward movement together with an inflatable cushion on the outer end thereof for engagement by a passenger wherein the passenger will first engage a cushion and then movement of the passenger will be retarded by a shock absorbing arrangement.

Another object of the present invention is the provision of a passenger safety device for vehicles that is simple in construction, easy to adjust, easy to operate, well adapted for its intended purposes and relatively inexpensive to manufacture and install on all types of vehicles.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of a vehicle with portions thereof broken away showing the installation of the safety device of the present invention;

Figure 2 is a top plan view of the safety device of the present invention;

Figure 3 is a rear elevational view of the supporting plate for the cushion element;

Figure 4 is a side elevational view of the present invention with portions thereof being shown in section for illustrating the structural details thereof;

Figure 5 is a fragmental elevational view showing the serrated lug on the outwardly extending end of the piston rod; and Figure 6 shows an elevational view of the U-shaped clamp member for attaching the cylinder to the undersurface of the dash board of the vehicle.

Referring now specifically to the drawings, it will be seen that the numeral 10 generally designates the passengers safety device of the present invention for installation on a vehicle generally designated by the numeral 12 and including the usual passenger compartment 14 having a seat 16 therein together with a windshield 18, a fire wall 20 having an angularly and rearwardly extending portion 22 together with a dash board or instrument panel 24.

The safety device 10 generally includes a circular plate 26 secured to the fire wall 20 by attaching bolts 28, and the plate 26 is provided with a boss 30 screw threadedly receiving an adapter 32 having projecting pivot lugs 34 thereon receiving a pivot bolt 36 therethrough for pivotally supporting an elongated cylinder 38 having a pivot lug 40 at one end thereof pivotally mounted on the pivot bolt 36. The pivot lug 40 is detachably secured to the cylinder 38 by a screw threaded connection 42. The cylinder 38 is also provided with a laterally extending boss 44 having a passage 46 therein that is in communication with the laterally extending passage 48. A screw threaded needle valve 50 is threaded into the passage 46 for regulating the flow of air from the interior of the cylinder 38 through the aperture or passage 48. The other side of the cylinder 38 is provided with a removable cap 52 screw threaded on a boss 54 having a passage 56 therein together with a spherical ball check valve 58 and a coil compression spring 60 whereby the spherical check valve 58 normally closes an opening 62 in the cap 52 whereby air will be admitted into the cylinder 38 when the pressure therein is reduced sufficiently to compress the spring 60 and when the pressure in the cylinder 38 is equal to the atmospheric pressure, the ball 58 will be moved outwardly, thereby closing the opening 62 which forms an effective check valve for admitting air into the cylinder 38.

Slidably positioned in the cylinder 38 is a piston 64 having a seal member 66 thereon and a rigid hexagonal piston rod 68 extending therefrom. The piston rod 68 extend outwardly from the other end of the cylinder 38 and terminates in a pivot lug 70 having a plurality of radial serrations 72 extending from a central aperture 74. In order to secure the cylinder 38 in position, a generally U-shaped clamp member 76 is provided for attachment to the undersurface of the dash board 24 by suitable fastening bolts 78 which extend through the dashboard 74 and horizontal portions 80 of the U-shaped clamp 76.

A plate 82 is provided with a pair of pivot lugs 84 on the rear surface thereof for receiving therebetween the pivot lug 70 and a clamp pivot bolt 86 extends through aligned openings for assembling the plate 82 on the pivot lug 70. The lugs 84 are provided with mating serrations 88 for matching the serrations 72 thereby securing the plate 82 in rigid adjusted position in relation to the piston rod 68. It is noted that one of the lugs 84 is welded to the rear surface of the plate 82, as indicated by the numeral 90 and the other of the lugs 84 is secured to an offset portion 92 of the welded lug 84 by a bolt 94, thereby permitting assembly of the plate 82 onto the pivot lug 70.

Secured to the front surface of the horizontally elongated plate 82 is an enlarged plate 96 that is secured to the plate 82 by a plurality of countersunk screw fasteners 98. Attached to the front surface of the enlarged plate member 96 is an inflatable cushion member 100 in the form of an enlarged flexible and resilient container-like member and the inflatable cushion 100 is provided with a flexible hose 102 for inflation and deflation thereof, and, of course, a suitable means may be provided for closing the flexible hose 102.

In practical use of the device, the cushion 100 together with the plate 96 and plate 82 is moved outwardly towards the passenger positioned on the seat 16 adjacent the driver. The check valve 58 will permit air to be positioned within the cylinder 38 as the piston 64 moves outwardly. As soon as the desired position of the cushion 100 is reached adjacent the chest region of the passenger, the inflatable member 100 may be inflated and the check valve 58 will close, thereby retaining the cushion 100 in position. Upon impact of the vehicle 12 with some obstruction, such as another car or a stationary object, the passenger will immediately be engaged with the cushion 100 and the piston rod 66 will cushion the movement of the passenger since the flow of air from the cylinder 38 is restricted by the needle valve 50 and, of course, may be adjusted as desired. This will permit some movement upon initial impact and will gradually reduce the increments of movement of the cushion member 100 during continuous deceleration of the vehicle 12.

While a pneumatic cushioning device has been illustrated, it will be understood that a hydraulic type shock absorber may be utilized having the necessary cushioning qualities wherein the passenger seated on the seat 16 will be prevented from being hurled against the dash board 24 or the windshield 18 or other parts of the front portion of the vehicle. Also, it will be noted that due to the inclined relation of the cylinder 38, the safety device 10 of the present invention may be installed on modern type vehicles having the usual heater mounted under the dash board on the fire wall 20. This particular mounting permits the installation of the safety device on all types of vehicles without interference with the operation of the heating mechanism normally found in present day vehicles.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the appended claims.

What is claimed as new is as follows:

A safety device for a vehicle having a dashboard, a firewall, and a front seat for receiving a passenger, said safety device comprising an elongated cylindrical member having a closed and an open end, a clamp bracket adjacent the open end of the cylindrical member for securing the cylinder to the dashboard, a bracket mounted on the firewall in spaced relation to the dashboard, means pivotally interconnecting the bracket and the closed end of the cylindrical member thereby rigidly mounting the cylinder on the vehicle, a piston slidable in said cylindrical member, a piston rod extending longitudinally from said piston and the open end of said cylindrical member, an enlarged plate pivotally adjustably attached to the free end of said piston rod, an inflatable cushion formed from flexible material on the surface of the plate disposed remotely from the piston rod for positioning forwardly of a passenger disposed on the front seat whereby the passenger will engage the cushion when thrown forwardly towards the dashboard, a seal member on said piston thereby forming a fluid tight seal in relation to the cylindrical member, a spring urged check valve arrangement in the closed end of said cylindrical member for permitting fluid to enter the cylindrical member when the piston is moved longitudinally towards the open end of the cylindrical member thereby permitting the plate and cushion to be positioned adjacent the front of the chest of the passenger, and an adjustable metering valve in the closed end of the cylindrical member for regulating the flow of fluid from the cylindrical member during longitudinal movement of the piston towards the closed end of the cylindrical member thereby regulating the speed of forward movement of the cushion to a predetermined speed thereby cushioning any impact of the passenger with the cushion and permitting the cushion to be disposed adjacent the dashboard of the vehicle for easy access to the front seat of the vehicle.

References Cited in the file of this patent

UNITED STATES PATENTS

| 1,098,271 | Lautenbacker et al. | May 26, 1914 |
| 1,619,697 | Brown | Mar. 1, 1927 |
| 2,322,755 | Voorhies | June 29, 1943 |
| 2,349,109 | O'Keeffe | May 16, 1944 |
| 2,499,993 | Gregg | Mar. 7, 1950 |
| 2,661,221 | Lockwood | Dec. 1, 1953 |

FOREIGN PATENTS

| 769,903 | France | June 18, 1934 |
| 1,065,793 | France | Jan. 13, 1954 |